(12) United States Patent
Lammlein, Jr.

(10) Patent No.: US 7,811,399 B2
(45) Date of Patent: Oct. 12, 2010

(54) TIRE COMPONENT CUTTER APPARATUS AND METHOD OF CUTTING

(75) Inventor: Robert Albert Lammlein, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1056 days.

(21) Appl. No.: 11/533,975

(22) Filed: Sep. 21, 2006

(65) Prior Publication Data

US 2008/0073020 A1    Mar. 27, 2008

(51) Int. Cl.
*B29D 30/30* (2006.01)
*B26D 1/08* (2006.01)
*B26D 7/14* (2006.01)

(52) U.S. Cl. .......................... 156/115; 83/18; 156/123; 156/256; 156/304.5; 156/406.4

(58) Field of Classification Search ................. 156/123, 156/133, 134, 405.1, 406.4, 406.6, 304.5, 156/162, 163, 244.18, 256, 269; 83/18, 175; 264/148

See application file for complete search history.

(56) References Cited

U.S. PATENT DOCUMENTS

| | | | |
|---|---|---|---|
| 2,539,240 A * | 1/1951 | Firestone | 83/18 |
| 3,992,981 A | 11/1976 | Stock | |
| 4,140,167 A | 2/1979 | Bohm et al. | |
| 4,163,685 A * | 8/1979 | Kubinski | 156/405.1 |
| 4,171,237 A | 10/1979 | Bohm et al. | |
| 4,228,839 A | 10/1980 | Bohm et al. | |
| 4,448,627 A * | 5/1984 | Satoh et al. | 156/405.1 |

(Continued)

FOREIGN PATENT DOCUMENTS

EP    0324199    7/1989

(Continued)

*Primary Examiner*—Geoffrey L Knable
(74) *Attorney, Agent, or Firm*—David L. King (57) ABSTRACT

A method of cutting an elastomeric strip of material is described. The method includes the step of advancing a strip of material 2 a predetermined distance by a conveyor means 30. Resisting reverse movement of the strip 2; tensioning the strip 2; and cutting simultaneously across the entire width of the strip 2 through the thickness of the strip 2 on a skive angle of 45 degrees or less preferably about 28 degrees to form a cut length of material thereby relaxing the tension in the strip as the skive cut ends 3 and 4 move apart. This method of cutting can be accomplished by providing an apparatus 100 for cutting an elastomeric strip of material 2 which has a frame assembly 50, a motorized feed conveyor 30 mounted onto the frame 50 for advancing the strip material 2, a cutter assembly 20 mounted on the frame assembly 50 including a guillotine cutter 22 oriented to move along a skive angle α, a second conveyor means 40 for supporting the strip 2, the second conveyor means 40 having rollers 42 having a one way directional movement in the forward direction resistant to movement in the reverse direction; a motor 32 connected to the feed conveyor 30 to drive the conveyor 30 in an advancing direction and having a reverse tensioning direction; and wherein the cutter assembly 20 is positioned between the second conveyor means 40 and the feed conveyor 30 to cut the strip 2 after a tension is applied to the strip by reverse motion of the feed conveyor 30.

6 Claims, 8 Drawing Sheets

U.S. PATENT DOCUMENTS

| | | |
|---|---|---|
| 4,895,610 A | 1/1990 | Egan |
| 4,922,774 A * | 5/1990 | Oldeman ............... 83/175 |
| 5,273,601 A | 12/1993 | Sergel et al. |
| 5,613,414 A | 3/1997 | Murphy et al. |
| 5,746,102 A | 5/1998 | Benzing, III et al. |
| 6,336,542 B1 * | 1/2002 | Mintonye, II ............ 193/37 |
| 6,755,105 B2 | 6/2004 | Downing |
| 6,790,301 B2 | 9/2004 | Risser et al. |
| 6,837,287 B2 | 1/2005 | Smith, Sr. et al. |
| 2004/0159386 A1 | 8/2004 | Deevers et al. |
| 2005/0113502 A1 | 5/2005 | Fitzharris Wall et al. |
| 2005/0205184 A1 | 9/2005 | Fitzharris Wall |
| 2005/0205186 A1 | 9/2005 | Wall et al. |
| 2005/0215684 A1 | 9/2005 | Fitzharris Wall |

FOREIGN PATENT DOCUMENTS

| | | |
|---|---|---|
| EP | 0548607 | 6/1993 |
| EP | 1674252 | 6/2006 |

* cited by examiner

TIRE COMPONENT CUTTER APPARATUS AND METHOD OF CUTTING

TECHNICAL FIELD

The present invention relates to a method and an apparatus to cut to length a strip of tire building material. The method and apparatus are particularly useful in cutting non reinforced tire components whose cut ends are particularly tacky and subject to surface curing or other property changing characteristics that could adversely affect the resultant splice when the cut ends of the cut length strips are joined during tire building.

BACKGROUND OF THE INVENTION

Tire components are typically formed as elastomeric strips of a defined width that are cut to a length and wound cylindrically onto a tire building drum wherein the cut ends are abuttingly joined or overlapped to create a spliced joint.

The various components of a tire are layered onto the building drum and rigid annular bead cores are applied over the lateral ends of the cylindrical carcass and these ends are thereafter folded over the bead cores and the resultant carcass is then toroidally shaped prior to having the belt reinforcing layers and the tread applied.

To achieve the desired tire uniformity these splice joints are often cut obliquely to the transverse direction of the strip so the splice joint does not create a noticeable harmonic vibration caused by either an overlap or mass change of material at the splice. Ideally the cut ends would be joined with little or no mass variation. One way to attempt to achieve this is to cut the strips on a low skive angle, this creates an elongated chamfer surface that when overlapped creates less mass fluctuations at the cut joint. Such low skive angle cutting permits transverse cutting of the strips.

U.S. Pat. Nos. 5,746,102 and 6,755,105 are examples of low angle cutters and methods of cutting cord reinforced assemblies including a carcass ply. The cutters have blades or wires that traverse across the width of the blade while cutting on a very low angle. The resultant cut ends are elongated and by being cut without heated blades exhibit no surface curing.

When cutting treads it has been found that it is often desirable to heat the knife blade to about 500 degrees F. (260 degrees C.) as is taught in U.S. Pat. No. 5,613,414 while cutting across a thick tire tread to increase cutting speed, but avoiding surface blooming of sulfur which tends to weaken the splice joint. In that patent it is disclosed that the prior art use of a guillotine cutter should be avoided wherein it is stated that prior art cutters for high mass, large cross-section components of rubber material have also included conduction-heated guillotine blades to plunge cut through the rubber material. There have been problems with this type of cutter because it utilizes a wedge-shaped blade which distorts the cut surface by compressing the trailing edge and elongating the leading edge. Splice control has been difficult which adversely affects tire uniformity. This prior art system is timer driven and the cut edges are exposed to the hot knife blade as it continues to plunge through the material. In addition the hot knife is positioned above the rubber material which has caused surface blooming. By surface blooming is meant surfacing of oils due to heat. Problems have also been experienced with incomplete cutting and rebound causing the leading and trailing cut edges to adhere after being cut. Control of the blade temperature has been difficult and slow because of the large thermally conductive mass. The time required for replacement of the blades has also been substantial because the larger mass involved requires considerable time for cooling.

While the use of guillotine type cutters has some noted drawbacks it is undisputed that the ability of a guillotine blade to cut the strip through its relatively thin cross sectional thickness as compared to passing a blade or wire cutter across the entire transverse width of a strip is accomplished with far greater speed. Accordingly the rapid time the guillotine cutter accomplishes the task of cutting an elastomeric strip to length is an ideal feature if the other noted shortcomings can be overcome.

This is particularly true when cutting a relatively new tire component recently being incorporated into both passenger and truck tires that provides a built in sealant for punctures. In US patent publication 2005/0113502 a pneumatic tire with a built in colored sealant layer is disclosed. In that publication it is noted various pneumatic tires have been proposed which contain a built in sealant layer based on a depolymerized butyl rubber layer, the list including those described in U.S. Pat. Nos. 4,895,610; 4,228,839; 4,171,237; 4,140,167 and patent application U.S. Ser. No. 10/171,057 filed Jun. 13, 2002; Ser. No. 10/368,259 filed Feb. 17, 2003 and Ser. No. 11/126,503 filed May 11, 2005 among others.

For the most part these sealants include an organoperoxide component in their chemical composition that results in a depolymerization of a major portion of the uncured butyl rubber during vulcanization which exposed the material to heat which activates the process to create or form a very tacky material. Prior to exposure to heat the material is made into elongated strips as any other tire component. However, even though the material is made in strips of material the ability to cut such a layer to length and to form consistent splice ends has not been without difficulty. Any cutting technique that generates localized heating sufficient to start depolymerization at the surface needs to be avoided. Cold cutting tends to push the material much like trying to cut taffy, leaving non uniform ends for splicing and if successfully cut the ends will literally re-bond themselves together as though having never been cut due to the exceptional degree of tackiness of the material when cut.

Accordingly the inventors of the present invention have discovered a novel apparatus and method for cutting this type of material which greatly improves the uniformity and the time to cut such a strip of material to a desired length. Both the apparatus and the method are described hereinafter.

SUMMARY OF THE INVENTION

A method of cutting an elastomeric strip of material is described. The method includes the step of advancing a strip of material a predetermined distance by a conveyor means. Resisting reverse movement of the strip; tensioning the strip; and cutting simultaneously across the entire width of the strip through the thickness of the strip on a skive angle of 45 degrees or less preferably about 28 degrees to form a cut length of material thereby relaxing the tension in the strip as the skive cut ends are moved apart. Preferably the elastomeric strip could be a strip of sealant material and the method could further include the step of supporting the strip on a second conveyor means having a plurality of one way directional rollers which provide a frictional resistance to reverse movement of the strip to facilitate the tensioning of the strip prior to cutting. The step of tensioning further can include the step of reversing the direction of the first conveyor means to tension the strip prior to or as the cutting occurs. Preferably wherein the strip is the sealant material the method steps further include heating a guillotine cutter blade to a temperature between 190 and 210 degrees F. preferably at a temperature of about 198 degrees F.

The method wherein the step of advancing the strip further can include the step of sensing the movement in the strip, stopping the advancement of the strip after a predetermined distance has been achieved to define a cut length of strip material thereafter tensioning and cutting the strip. The method may further include supporting the cut to length strip on a second conveyor means adjacent the cutter assembly moving the cut strip and the second conveyor means to a cylindrical tire or band building drum and applying the cut to length strip onto the tire or band building drum directly or overlaying a previously placed inner liner layer or other tire component and splicing the skived cut ends. This method may further include stitching the strip to the tire or band building drum directly or sticking onto the previously placed inner liner layer or other tire component. The method may further include overlaying a second inner liner layer or barrier or ply layer onto a sealant material thereby encapsulating the sealant material between two other layers in the process of forming an unvulcanized tire assembly.

All of these methods can be accomplished by providing an apparatus for cutting an elastomeric strip of material which has a frame assembly, a motorized feed conveyor mounted onto the frame for advancing the strip material, a cutter assembly mounted on the frame assembly including a guillotine cutter oriented to move along a skive angle, a second conveyor means for supporting the strip, the second conveyor means having rollers having a one way directional movement in the forward direction resistant to movement in the reverse direction; a motor connected to the feed conveyor to drive the conveyor in an advancing direction and having a reverse tensioning direction; and wherein the cutter is positioned between the second conveyor means in the feed conveyor to cut the strip after a tension is applied to the strip by reverse motion of the feed conveyor.

The apparatus may further include a cutter anvil attached to the frame at or near the distal end of the feed conveyor to support the strip at a cutting location. A heater means can be provided to the cutter blade, a temperature sensor and a control means for adjusting and controlling the blade temperature. The apparatus may further include a control means for setting the distance of the strip which is to be advanced prior to cutting and controlling the amount of distance of reverse movement on the feed conveyor to thereby tension the strip. A sensor means to measure the movement of the strip and to signal the controller to advance the cutter after a tension is applied may be further employed; the sensor means is preferably a photo light sensor that can detect the movement of the strip. The apparatus in a preferred embodiment includes a moveable transfer conveyor wherein the second conveyor means is mounted on a moveable transfer frame such that the conveyor can be moved between the cutter location and a tire or band building drum located at an opposite end of the second conveyor means. The transfer conveyor can be moved adjacent to the cutting location during cutting and after cutting a transfer conveyor can be moved bringing the second conveyor adjacent to a tire or band building drum for application of the cut to length strip onto the building drum. To accomplish this transfer movement, the transfer conveyor is preferably attached to a pivotably movable frame between the cutting location and the building location. The pivotably movable frame includes a hydraulic cylinder connected to a pivoting portion of the frame to provide movement between locations.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Bias Ply Tire" means that the reinforcing cords in the carcass ply extend diagonally across the tire from bead-to-bead at about 25-65 degree angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the crescent—or wedge-shaped reinforcement typically used to reinforce the sidewalls of runflat-type tires; it also refers to the elastomeric non-crescent shaped insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Sidewall" means a portion of a tire between the tread and the bead.

"Skive" or "skive angle" refers to the cutting angle of a knife with respect to the material being cut; the skive angle is measured with respect to the plane of the flat material being cut.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 6 is an enlarged view of a pick up and transfer assembly device for moving the cut strip onto a tire or band building drum. FIG. 6 being taken from the view in FIG. 3.

DETAILED DESCRIPTION OF THE INVENTION

Figure 1:
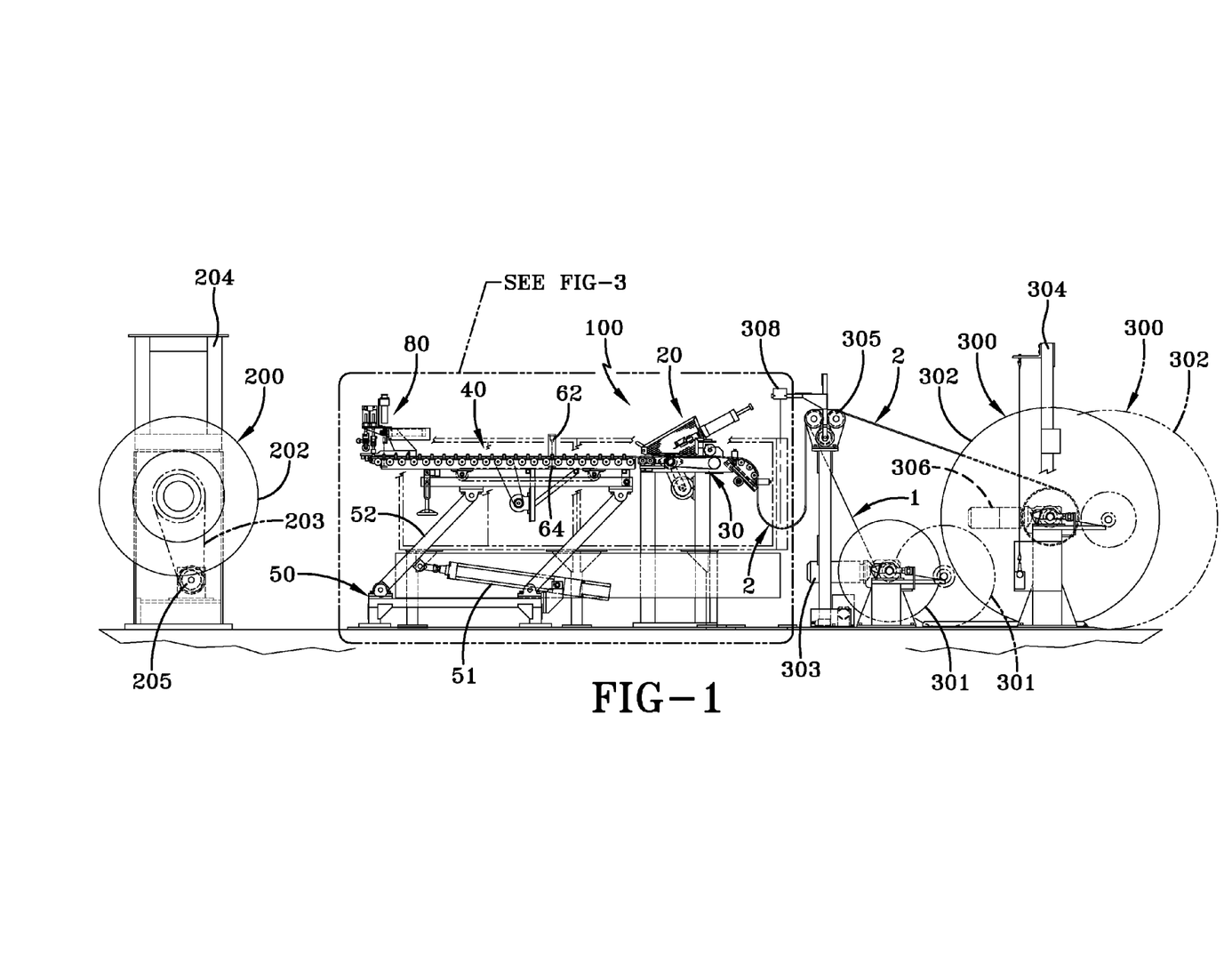
FIG. 1 is a plan view of the apparatus according to the invention. The plan view includes the cutting apparatus, a spool delivery system and a tire or band building workstation.
Figure 3:
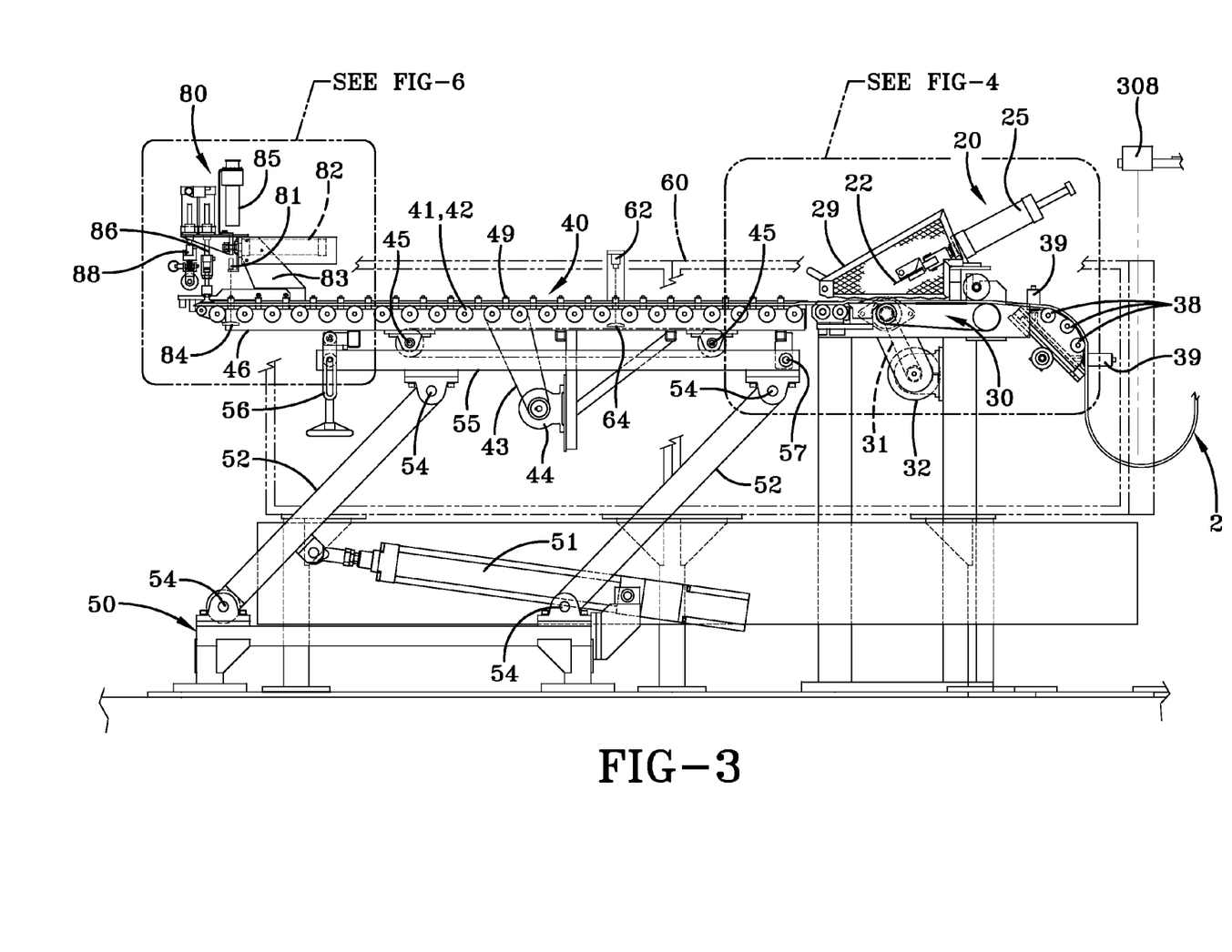
FIG. 3 is a plan view of a cutting apparatus according to the present invention taken from FIG. 1.
Figure 4:
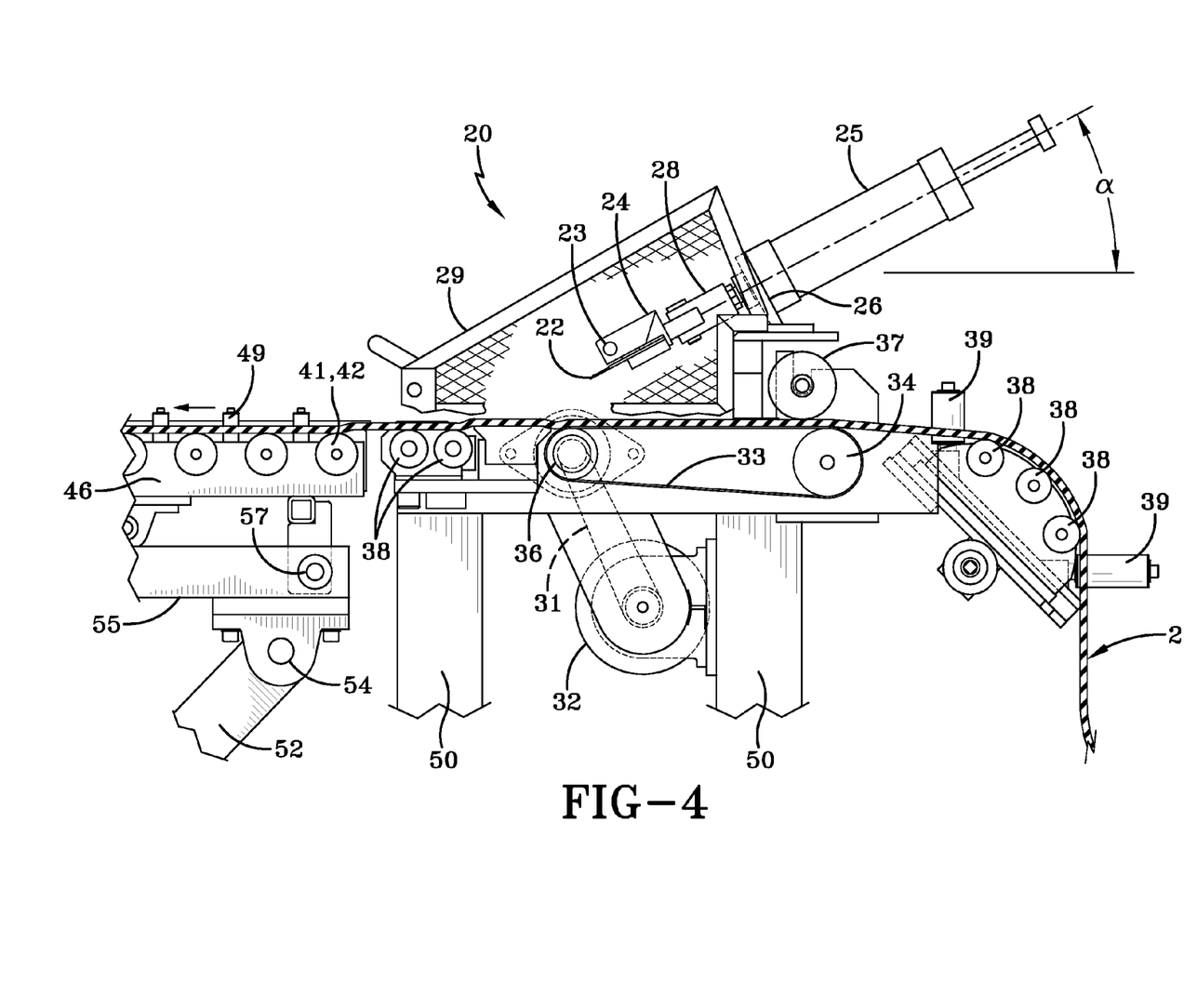
FIG. 4 is an enlarged view of a cutting assembly and the first or feed conveyor means as taken from FIG. 3.

With reference to FIG. 1 the strip cutting apparatus 100 is shown positioned between a spool delivery system 300 which includes a large spool 302 that is attached to a motorized frame 304 that delivers and rotates the spool 302 as it feeds out the strip material 2 on a separation liner 1 into the roller mechanism 305 separating the liner 1 and rewinding it onto a smaller spool 301 as shown and looping the strip of material 2 into the feed conveyor means 30 as shown. As shown in FIG. 4 the loop of material 2 feeds up over the roller mechanism 38 and into the feed conveyor 30 to be delivered past the cutting assembly 20 onto the second transfer conveyor means 40. As shown in FIG. 3 the strip of material 2 proceeds past a first sensor 62 it is fed a predetermined distance past a cut location at this predetermined distance the feed conveyor means 30 is stopped. The feed conveyor means 30 then is rotated in a reverse direction as shown in FIG. 4. The transfer conveyor means 40 has a one way directional Torrington bearings 41 that drive knurled rollers 42 in one direction only, as the strip 2 is resting on the plurality of rollers 42, the weight of the strip 2 prevents reverse motion thereby a slight rotation of the feed conveyor means 30 in the reverse direction applies a tension onto the strip 2 such that the strip 2 is pre-stressed and stretched slightly prior to cutting. As shown in FIG. 1 at the opposite end of the transfer means 40 is a tire or band building work station 200.

Figure 2:
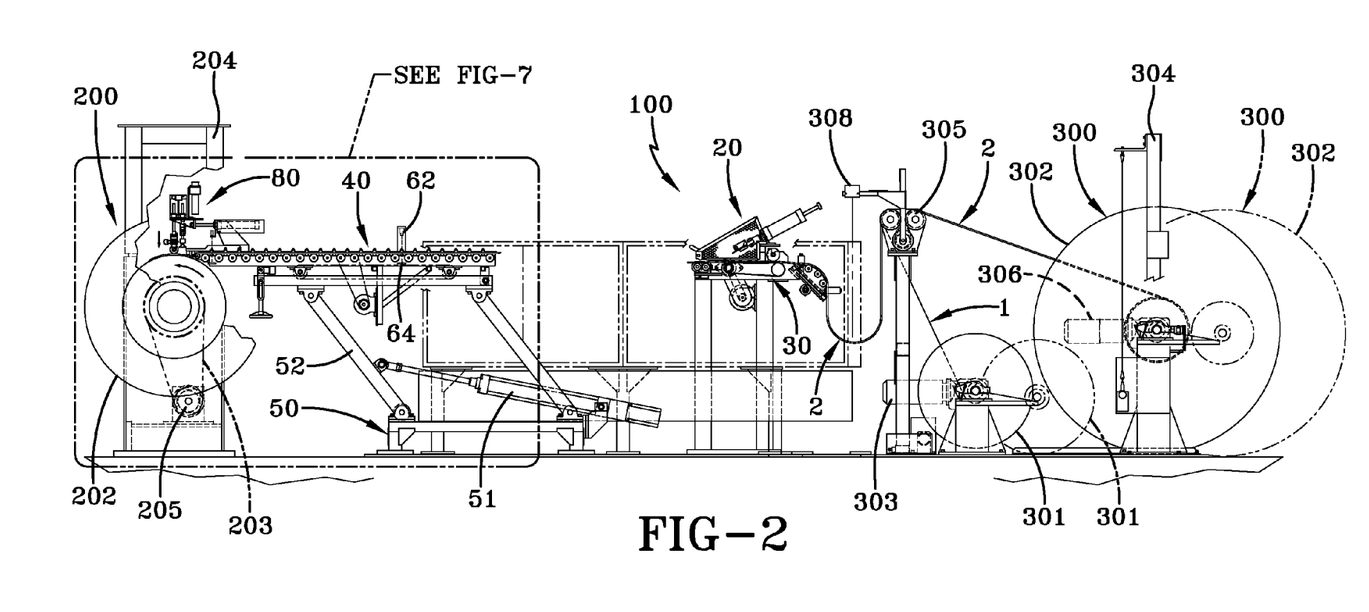
FIG. 2 is a plan view of an apparatus according to the present invention wherein a transfer conveyor is moved to a strip applying position.

With reference to FIG. 2 after the strip 2 is cut the cut to length strip material 2 is advanced to a stop location where the cut end 3 is detected by a second sensor 81 preferably a photo detector 81 with a reflector 84 once the strip is moved a sufficient distance away from a first end to a second transfer end the entire transfer conveyor 40 is pivotably rotated in the direction of the tire or band building drum 203 as shown in FIG. 2. At this point the cut to length strip 2 can be transferred onto the tire or band building drum 203 as the drum 203 rotates the strip 2 is rolled onto the drum 203 removing it from the transfer conveyor means 40, once it is removed the transfer conveyor means 40 can be moved back to the cutting position. As shown in FIGS. 1, 2, 3 and 7 the movement of the transfer conveyor 40 is such that the frame 50 has four pivoting portions or legs 52 that are rotatable about the fasteners 54. The upper pivoting portions or legs 52 are pinned to a pair of horizontal frame supports 55 upon which roller wheels 45 rest in a channel. The roller wheels 45 are attached to the frame 46 of the transfer conveyor means 40. As an hydraulic or electric cylinder 51 is fully retracted as shown in FIGS. 1 and 3 the transfer conveyor 40 is in the cutting position. After cutting the strip 2 to the cylinder rod 59 of the cylinder 51 extends and being connected at pivot point 58 on a pivoting leg 52 as shown the transfer conveyor 40 moves toward the tire building system 200. The transfer conveyor means 40 is pivotably attached to the frame support 55 at the cutter end fastener 57 and at the slotted end mechanism 56. The slotted end mechanism 56 allows the transfer conveyor 40 to lift as the legs 52 pivot permitting the desired movement.

With reference to FIG. 3 an enlarged plan view of the cutting apparatus 100 is shown. The cutting apparatus 100 includes the frame 50 which is preferably mounted to a plate or the floor wherein the feed conveyor means 30 is shown on the left hand side wherein strips of material 2 are fed from the loop of material 2 as shown, a photo detecting eye sensor 308 measures the distance of the loop to insure a sufficient amount of material 2 is always provided into the feed cutter mechanism 30 such that as the material 2 advances the length of the loop is sufficient to provide at least a full cut length of material 2. As shown a strip of material 2 passes over the rollers 38 and is guided by guide rollers 39 keeping the width in proper alignment with the cutting assembly 20. As the strip 2 passes a first detector or sensor 62 it breaks a beam between the sensor 62 and a reflector 64 which relays a signal back to a controller means 60 as it is moved into a sufficient distance that the exact cut length can be established. As shown the second transfer conveyor means 40 is shown in the cutting position wherein it is moved adjacent to the cutter assembly 20 and the feed conveyor means 30.

With reference to FIG. 4 a strip 2 is shown being supported on an anvil 21 below the strip 2 wherein the cutter assembly 20 has a guillotine blade 22 which is a mechanism inclined on a skive angle α of less than 45 degrees, the skive angle α preferably being about 28 degrees. The cutter blade 22 is shown transverse to the strip length but can be obliquely oriented to cut across strip on a bias angle of 120 degrees to 80 degrees relative to the length of the strip 2. The entire cutting assembly 20 as shown is covered by a grill cage 29 to prevent the operator from getting his hand into the device during operation. This ensures that the cutter path will strike the strip 2 and the anvil 21 as it moves forward to make a cut. As shown a heater element 23 is positioned on the blade assembly and is encased in the blade housing 24 surrounding the blade. A thermocouple sensor (not shown) is provided on the blade 22 such that the temperature can be precisely maintained on the guillotine cutter blade 22. This is important when the material 2 is a sealant material in that if the cutter blade 22 was not heated or was cold the material 2 will only push in and not cut cleanly, therefore the spliced ends would create a non uniformity during the cutting operation. If the cutting blade 22 is set a temperature too high the material 2 will start to depolymerize locally at the cut surface. This creates an additional problem of having a gooey or tacky substance at the splice line. Once the material depolymerizes it is impossible to create a uniform splice. Accordingly the temperature of cutting is critical to the performance of the finished product, particularly when the material is a built in sealant material. The blade temperature is preferably set between 190 degrees to 210 degrees F., in practice a temperature of about 198 degrees has been found to make the best cuts on strips sealant material.

Figures 4A, 5:
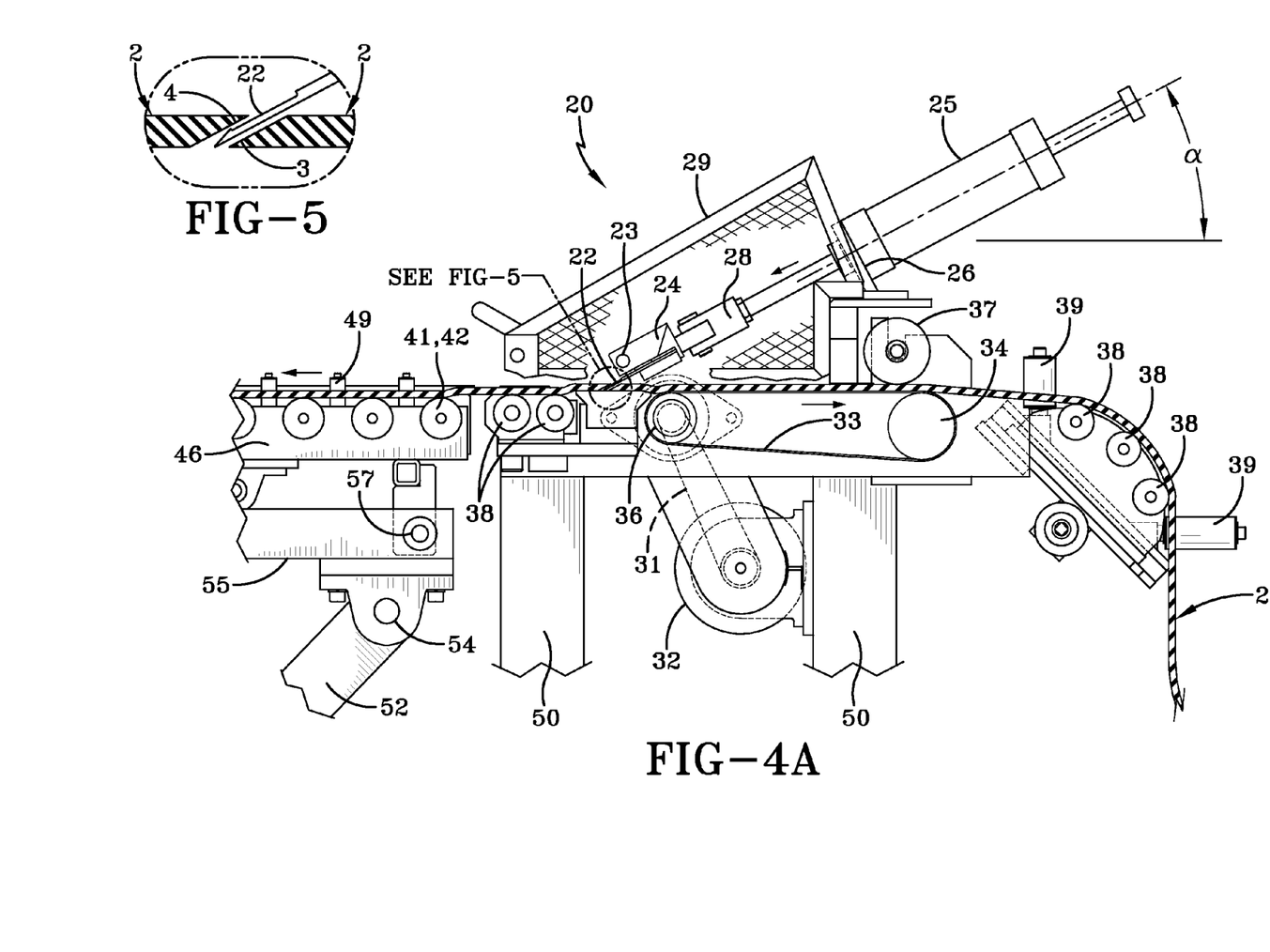
FIG. 4A is a plan view of the cutting assembly shown in the cutting motion wherein the strip is being cut according to the present invention.
FIG. 5 is an enlarged view of the cutter blade as it passes through the elastomeric strip of material.

With reference to FIG. 4A the entire cutter assembly is attached to a bracket 26 mounted on the frame 50 the cutter blade 22 is shown wherein a cylinder 25 is activated and the cylinder rod with attachment end 28 connected to the cutter blade housing 24 directs the cutting blade 22 moving it forward into the strip material 2 and as shown the feed conveyor means 30 is shown with the drive roller mechanism 36 operating or moving the conveyor belt 33 around the drive roller 36 and the free roller 34 as the strip is held down by the hold down roller 37 in a reverse direction all powered by the drive belt 31 and motor 32. This tensioning of the strip 2 can occur slightly prior to cutting or during cutting if so desired. The purpose of this is as the conveyor means 30 moves in a reverse direction a tension or pulling of the strip material 2 occurs. The strip material 2 resting on the transfer conveyor 40 is positioned between guide rollers 49 and is placed on rollers 42 that have knurled surfaces (not illustrated) and the ends of the rollers 42 are supported by one way directional Torrington bearings 41, these bearings 41 only allow for forward movement of the strip 2 along the conveyor means 40. Accordingly the weight of the material 2 and the knurling of the surfaces insure that as the feed conveyor means 30 reverses direction the strip material 2 will stay in position and a slight stretching or tensioning of the strip 2 occurs, this stretching is critical in the cutting in that as the cutter blade strikes across the entire width of the strip it will almost instantaneously cut through the thickness of the material 2 across the entire width until it strikes the anvil 21 at which point the entire strip 2 is cut. As the strip 2 is pre-tensioned both the leading edge 3 and the trailing edge 4 of the cut will move away instantaneously from each other and the cutter blade 22. This is significant in that the strip material 2 does not stay in direct physical contact with the blade 22. As soon as it is cut it is moved in a direction away from the heated blade 22. This helps ensure that the material 2 does not start to be depolymerized due to the heat of the cutting blade 22.

Figure 6:
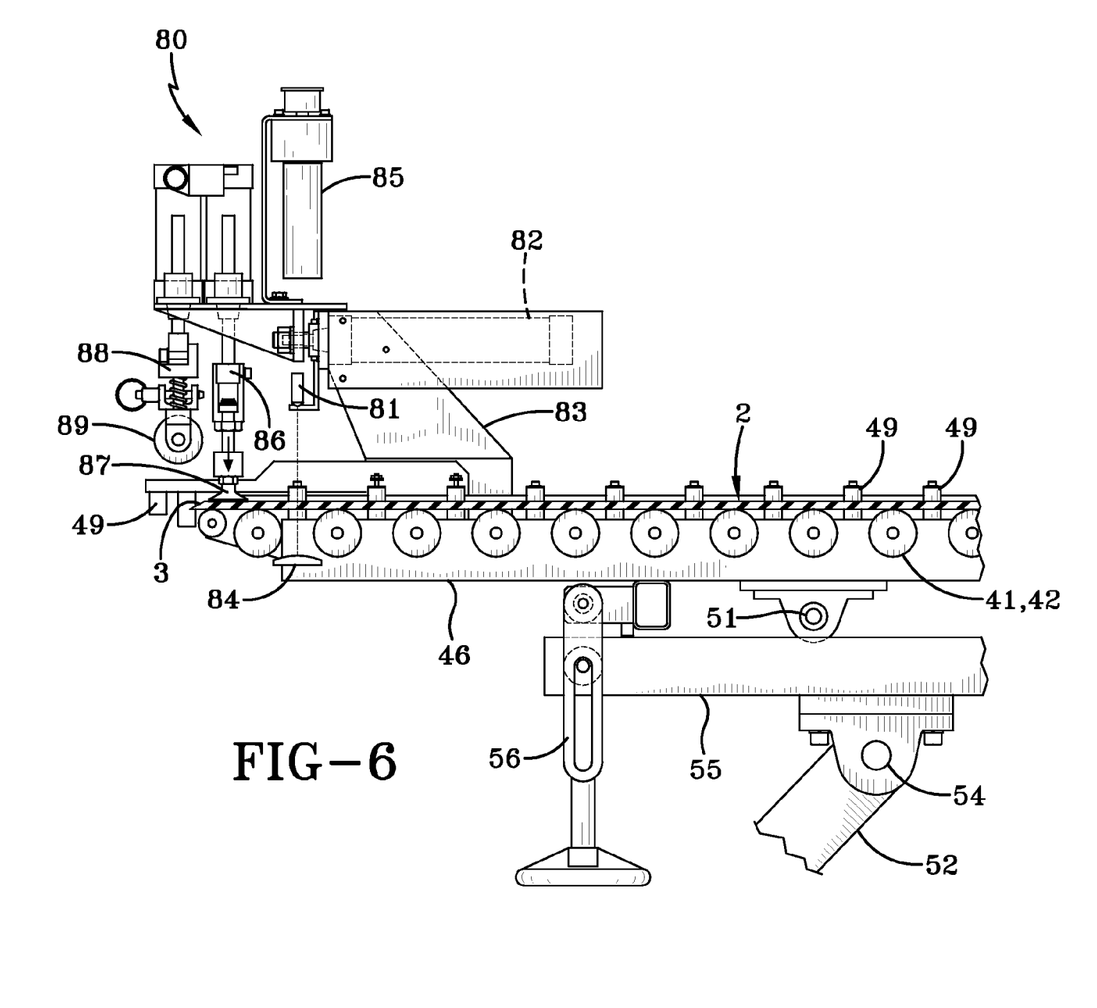
Figure 7:
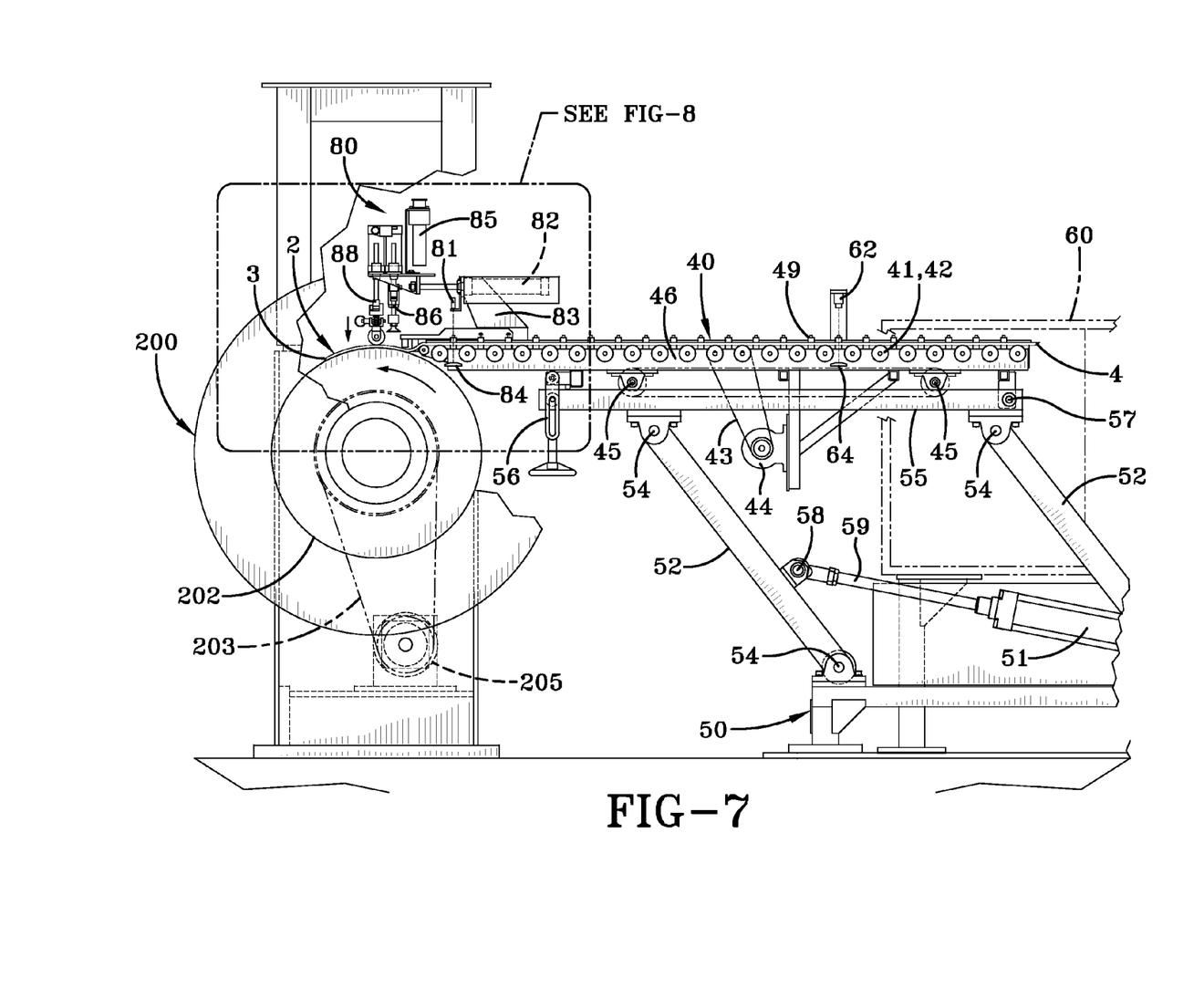
FIG. 7 is an plan view of the transfer conveyor showing a cut strip being applied to a band or tire building drum.
Figure 8:
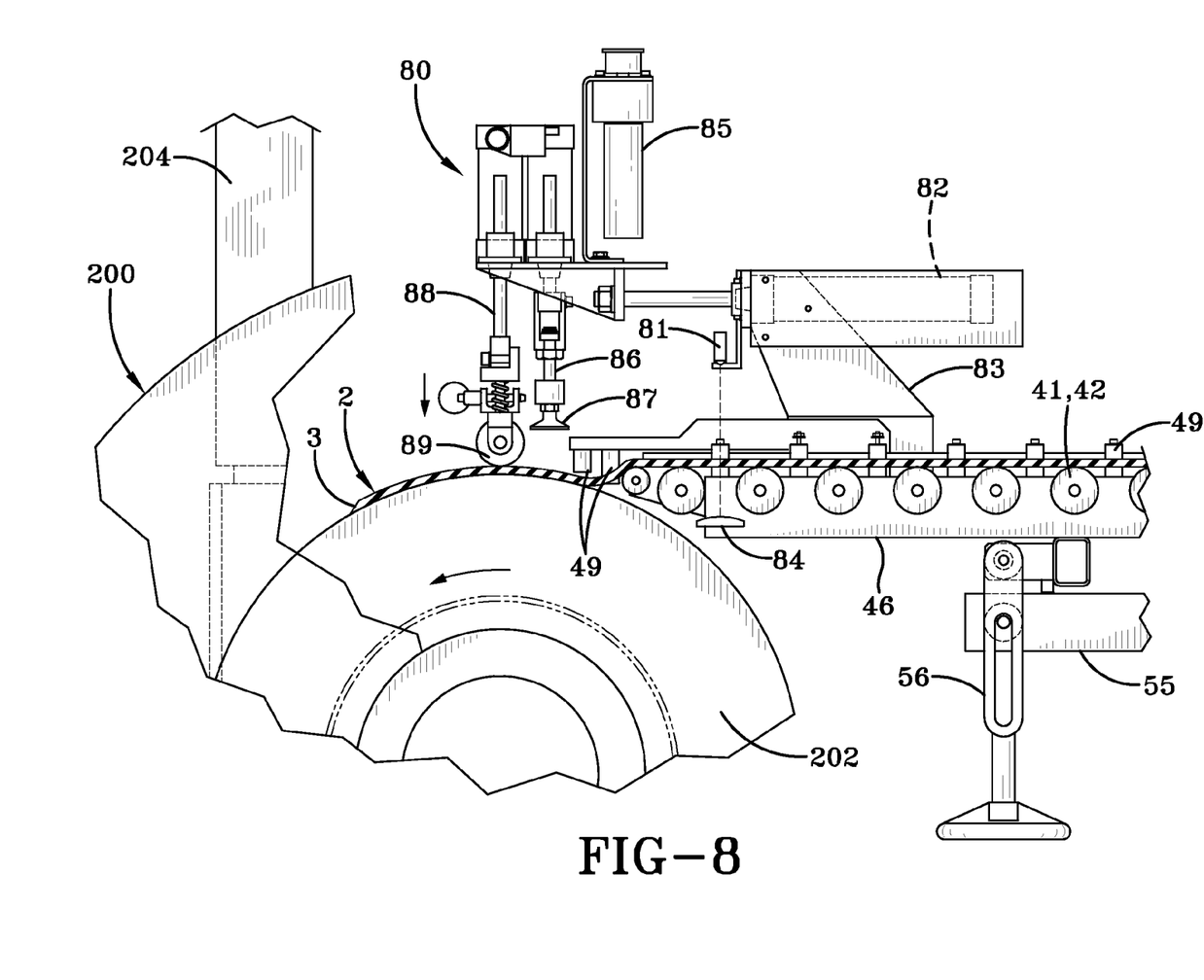
FIG. 8 is an enlarged view of the transfer mechanism taken from FIG. 7 showing the strip being applied to the band or tire building drum.

With reference to FIGS. 6, 7 and 8 once cut, the material 2 is then moved to the far or second end of the transfer conveyor means 40, a second sensor 81 preferably a photo eye 81 senses the end 3 of the strip 2 as it breaks a beam between the sensor 81 and a reflector 84 and ensures that the strip 2 stops at a location wherein a pick up device 80 as shown having a pick up device 86 with a suction cup end 87 which can move down and contact the strip material 2 just behind the spliced cut end 3. The entire transfer mechanism 40 as shown in FIG. 7 is moved forward towards the tire or band building drum 202. As the cut to length strip of material 2 is moved to the tire building drum 202, the drum can be rotated by the drive motor 205 which is connected to the drum 202 by a drive chain or belt 203 as shown in FIG. 7 such that the strip 2 at cut end 3 is picked up by the suction cup 87 and moved forward as cylinder 82 activates extending the entire pick up device assembly 80 with the cut strip 2 held in place by suction cup 87 to move to the tire building drum. A roller mechanism device 88 with a roller 89 stitches the strip material 2 onto the rotating drum 202 or onto a previously laid tire component preferably a liner material that is impervious to air commonly referred to as an inner liner layer as the drum 202 is rotated counterclockwise as shown.

With reference to FIG. 8 a strip 2 is then shown being stitched directly onto the drum 202 with a downward pressure as the drum rotates the entire strip 2 is laid onto this drum 202 and the splice ends 3 and 4 will meet and be joined forming an annular band.

Once the band of strip material 2 is applied to the band or tire building drum 202 the transfer mechanism 40 can then be pivotably rotated back into the cutting position and second strip 2 can be cut for the next tire assembly to be formed.

With further reference to FIGS. 2, 3 and 7 the transfer conveyor means has a motor driven assembly having a motor 44 and a belt 43 as shown connected to two of the one way directional rollers 42 such that the rollers are driven in the forward direction to move the cut strip 2 for transfer to the building drum 202. As previously indicated these rollers 42 can only move in a forward or advancing direction. Accordingly they provide a unique way of enabling the strip component 2 to be pre-stretched prior to cutting as previously described.

A sensor and cam system can be provided on the transfer conveyor means 40 so that once the mechanism 40 moves back into the cut position the switch occurs and the sequence of moving the strip 2 and advancing it from the feed conveyor 30 past the cutter assembly 20 and onto the transfer conveyor means 40 can occur such that the strip material from the spool can be measured again at the same location and precisely cut as previously described. During this cutting operation the transfer conveyor assembly 40 moves away from the tire and band building station 200 such that an operator can go in and place additional tire components onto the tire carcass assembly in the process of building a tire. Such assemblies could include the ply, the chipper, beads and other green tire components such as the sidewalls to form a green carcass which will subsequently be toroidally shaped wherein the belt reinforcing layer and tread can be applied later and then the entire assembly can be placed into a mold to be vulcanized. During the step of vulcanization heat is applied at pressure to cure the tire as the tire is being cured the peroxide in the strip of sealant layer 2 can be activated such that it initiates a depolymerization of the sealant. The strip material 2 preferably is interposed between two layers of liner material, in this fashion the entire tacky substance can be contained between the two impervious layers, subsequently in use if the tire rolls over a nail and is punctured the sealant will then be able to fill the hole and prevent air loss in a tire. While the present invention was primarily directed to the cutting problems of cutting strips of sealant material it must be appreciated the method and apparatus is well suited to cut any elastomeric tire component not reinforced by cords such as liners, sidewalls and inserts and bead filler to name a few.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of cutting an elastomeric strip of sealant material having an organoperoxide component that results in a depolymerization of a major portion of the strip during vulcanization to create or form a very tacky sealant material capable of filling nail puncture holes to prevent air loss in a tire, comprises;

advancing a strip of the sealant material a predetermined distance on a first conveyor means;

resisting reverse movement of the strip relative to the direction of advance by supporting the strip on a second conveyor means having a plurality of one way directional rollers which provide a frictional resistance to reverse movement of the strip, the second conveyor being on a downstream side of a cutter assembly relative to the direction of advance;

tensioning the strip wherein the step of tensioning includes the step of reversing the direction of the first conveyor means while resisting reverse movement of the strip by said second conveyor means to tension the strip as the cutting occurs;

heating a guillotine cutting blade of the cutter assembly to a temperature between 190 degrees and 210 degrees F.; and cutting simultaneously across the entire width of the strip with the heated guillotine cutting blade through the thickness of the strip on a skive angle of 45 degrees or less to form a cut to length strip of material thereby relaxing the tension in the strip as the skive cut ends of the strip move apart.

2. The method of cutting an elastomeric strip of material of claim 1 wherein the step of heating the guillotine cutting blade is set to a temperature of 198 degrees F.

3. The method of cutting an elastomeric strip of material of claim 1 wherein the step of advancing the strip includes the step of sensing the movement of the strip, stopping the advancement of the strip after a predetermined distance has been achieved between a first cut end of the strip and a cutter path to define a cut location for the second cut end to establish a cut to length strip of material after tensioning and cutting.

4. The method of cutting an elastomeric strip of material according to claim 1 further comprises:

supporting the cut to length strip on the second conveyor means adjacent the cutter assembly;

moving the strip and second conveyor means to a cylindrical tire or band building drum;

applying the cut to length strip onto the tire or band building drum directly or overlaying a previously placed inner liner layer or other tire component; and splicing the skived cut ends of the cut to length strip.

5. The method of cutting an elastomeric strip of material of claim 4 further comprises the step of:

stitching the strip to the tire or band building drum directly or overlaying a previously placed inner liner layer or other tire component.

6. The method of cutting an elastomeric strip of material of claim 5 further comprises the step of:

overlaying a second inner liner layer or a ply layer onto the sealant material thereby encapsulating the sealant material between two other layers in the process of forming an unvulcanized tire assembly.

* * * * *